United States Patent [19]

Kobayashi

[11] Patent Number: 4,574,008

[45] Date of Patent: Mar. 4, 1986

[54] APPARATUS FOR MOUNTING AN ELECTRON GUN ASSEMBLY WITHIN THE GLASS NECK OF A CATHODE RAY TUBE

[75] Inventor: Masahiro Kobayashi, San Diego, Calif.

[73] Assignee: Sony Corporation, Tokyo, Japan

[21] Appl. No.: 629,609

[22] Filed: Jul. 11, 1984

[51] Int. Cl.$^4$ .......................................... C03B 23/217
[52] U.S. Cl. ......................................... 65/155; 65/42; 65/57; 65/58
[58] Field of Search ...................... 228/123; 65/36, 42, 65/56, 57, 58, 153, 155

[56] References Cited

U.S. PATENT DOCUMENTS

| 2,338,336 | 1/1944 | Koch | 65/57 X |
| 2,886,336 | 5/1959 | Reynard | 65/155 X |
| 3,285,725 | 11/1966 | Loughridge | 65/155 X |
| 3,536,462 | 10/1970 | Eyster et al. | 65/57 X |

FOREIGN PATENT DOCUMENTS 616009 3/1961 Canada ................................. 65/155

*Primary Examiner*—Robert Lindsay
*Attorney, Agent, or Firm*—Lewis H. Eslinger; Alvin Sinderbrand

[57] ABSTRACT

In an apparatus for mounting, within the glass neck of a cathode ray tube envelope, an electron gun assembly which includes the usual glass stem in the form of a disk with an exhaust tubulation extending centrally therefrom for eventual evacuation of the envelope, an upright support tube is provided with a central bore which is closed at its lower end and opened at the upper end for receiving the exhaust tubulation when the electron gun assembly is supported by such tube with the stem above the upper end of the support tube, and the support tube further has longitudinal passages therein spaced outwardly from the central bore and isolated from the latter, such longitudinal passages opening at ends thereof adjacent the upper end of the support tube. The cathode ray tube envelope is supported with its glass neck extending downwardly about the stem of the electron gun assembly carried by the support tube, and the glass neck is heated in the vicinity of the stem so as to fuse together the neck and stem, whereupon an inert gas under pressure is supplied to the longitudinal passages of the support tube and exits therefrom through the passage ends below the stem to act on the heated neck for severing the latter immediately below the fusing thereof to the stem without the danger of blowing dust into the cathode ray tube envelope through the exhaust tubulation upon the supplying of the inert gas.

16 Claims, 8 Drawing Figures

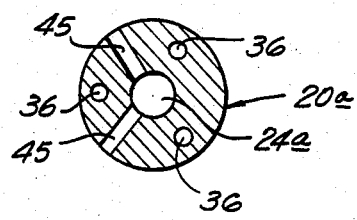
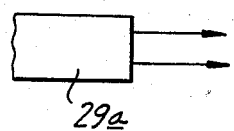
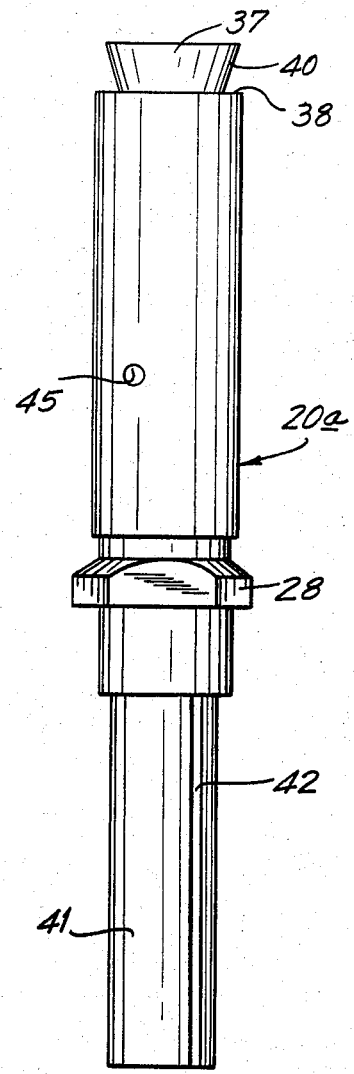
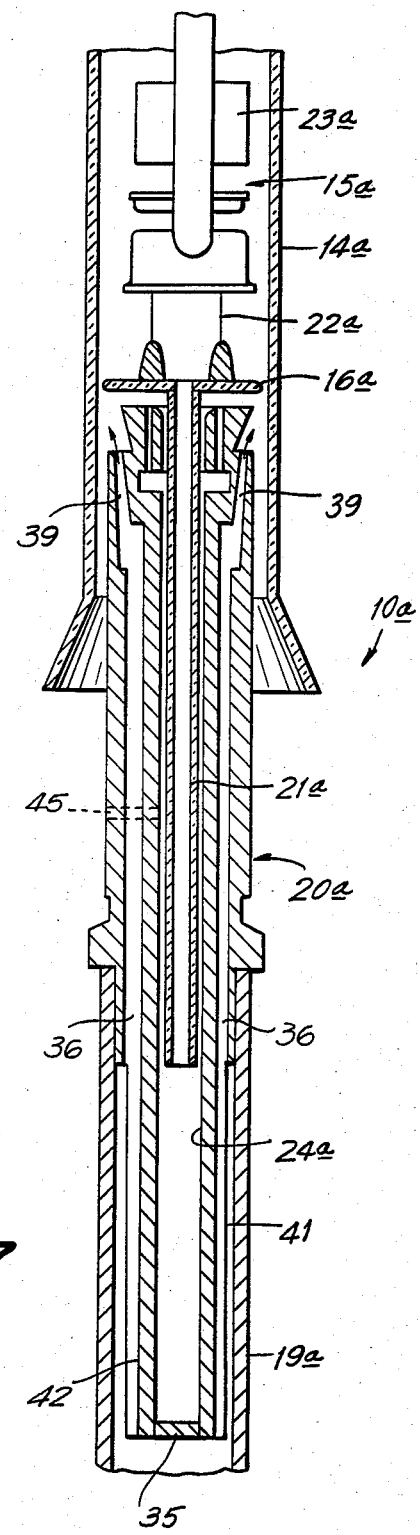

APPARATUS FOR MOUNTING AN ELECTRON GUN ASSEMBLY WITHIN THE GLASS NECK OF A CATHODE RAY TUBE

BACKGROUND OF THE INVENTION

1. Field of the Invention

This invention relates generally to apparatus for mounting an electron gun assembly within the glass neck of a cathode ray tube envelope, and more particularly is directed to improvements in the structure by which the electron gun assembly is supported during the fusing or welding of the glass neck of the cathode ray tube envelope to the glass stem of the electron gun assembly.

2. Description of the Prior Art

In the manufacturing of cathode ray tubes, for example, for color television receivers, after a phosphor screen has been formed on the inner surface of a glass face plate, an aperture grill is attached to the face plate which is then secured, at its periphery, to the large end of a funnel-shaped envelope having a relatively small diameter neck. Then, an electron gun assembly is inserted into the glass neck of the envelope and secured or mounted therein by fusing or welding together a glass stem of the gun assembly and the neck of the envelope. After the electron gun assembly is thus mounted in the envelope, gas is evacuated from the latter by way of an exhaust tubulation which extends centrally from the stem of the gun assembly. Then the exhaust tubulation is sealed or tipped-off for maintaining the evacuated condition of the envelope.

During the mounting of the electron gun assembly in the neck of the cathode ray tube envelope, the electron gun assembly is supported by an upright support tube having a central bore extending therethrough for receiving the exhaust tubulation of the electron gun assembly with the glass stem of the latter arranged above the upper end of the support tube. The metallic leads of the electron gun assembly which extend through the stem in a circle about the tubulation for electrical connections to gun elements in the envelope are accommodated in auxiliary bores opening at the upper end surface of the support tube and being arranged in a circle about the central bore. While the cathode ray tube envelope is suitably supported with its glass neck directed downwardly, the electron gun assembly carried by the support shaft is inserted upwardly into the glass neck by means of a vertically movable spindle in which the support shaft is disposed. When the electron gun assembly is suitably positioned in the neck, the glass neck is gradually heated in the vicinity of the electron gun stem by one or more burners and, when the neck and stem are sufficiently heated they are fused or welded to each other. After such welding, the portion of the glass neck below the stem is severed and drops away, whereupon the neck and stem are cooled gradually to avoid cracking thereof.

For the severing of the lower end portion of the neck below the glass stem to which the neck is fused, nitrogen gas under pressure is supplied through the spindle and then through the central bore of the support tube to exit from the latter immediately under the stem through the upper end of the central bore and also through the auxiliary bores which loosely receive the metallic leads so as to exert outwardly directed pressure against the glass neck immediately below the fusing or welding thereof to the stem.

However, in the foregoing arrangement according to the prior art for supplying the nitrogen gas under pressure by way of the central bore of the support tube which also receives the exhaust tubulation of the electron gun assembly, the nitrogen gas under pressure and any dust particles, usually of glass, carried thereby is also delivered to the interior of the cathode ray tube envelope. Such dust particles within the cathode ray tube envelope give rise to problems. Thus, for example, if the dust particles adhere to the phosphor screen or are caught between the elements of the aperture grill, black dots will appear on the screen at locations corresponding to the dust particles. Further, due to the high voltage applied to the interior of the cathode ray tube envelope, dust particles therein cause a discharge which damages the cathode of the electron gun. Similarly, if the dust admitted to the interior of the envelope adheres to the cathode of the electron gun, this also causes discharging and consequent damage. If the dust is caught between grids of the gun, leaking or sparking in the electron gun can result.

OBJECTS AND SUMMARY OF THE INVENTION

Accordingly, it is an object of this invention to provide an apparatus for mounting an electron gun assembly within the glass neck of a cathode ray tube envelope, as aforesaid, and which avoids the described problems associated with the prior art.

More particularly, it is an object of this invention to provide an apparatus for mounting an electron gun assembly within the glass neck of a cathode ray tube envelope, and in which nitrogen or other inert gas under pressure is supplied for severing the glass neck immediately below the location at which the latter is fused or welded to the glass stem of the electron gun assembly, without the possibility of introducing dust or other contaminants into the cathode ray tube envelope.

A further object is to provide an apparatus for mounting an electron gun assembly within the glass neck of a cathode ray tube envelope, as aforesaid, and which avoids the build up of elevated air pressures within the cathode ray tube envelope as a result of the heating of the glass neck for fusing thereof to the stem of the electron gun assembly.

In accordance with an aspect of this invention, in an apparatus for mounting an electron gun assembly within the glass neck of a cathode ray tube envelope, which assembly includes a glass stem in the form of a disk with an exhaust tubulation extending centrally therefrom for eventual evacuation of the envelope, an upright support tube is provided with a central bore which is closed at its lower end and opened only at the upper end of the support tube for receiving the exhaust tubulation when the electron gun assembly is supported by the tube with its stem above such upper end, and the support tube is further provided with longitudinal passages therein spaced outwardly from the central bore and isolated from the latter, with such longitudinal passages each opening at one end adjacent the upper end of the support tube. In the apparatus embodying the foregoing support tube for the electron gun assembly, means are provided for supplying nitrogen or other inert gas under pressure to the longitudinal passages of the support tube so as to exit therefrom at the ends adjacent the upper end of the support tube, that is, below the glass stem of the electron gun assembly, whereby to act on the heated neck being fused or heated to the stem for severing the glass neck immediately below the fusing thereof to the stem.

In a preferred embodiment of the invention, in which the support tube extends from a vertically movable spindle to which the nitrogen gas is supplied, a lower portion of the support shaft within the spindle has grooves in its outer surface opening into the longitudinal passages for transmitting the inert gas from the spindle to the longitudinal passages.

Further, it is a feature of the apparatus according to this invention to provide the support tube with an outwardly directed flange adapted to rest on an upper edge of the spindle, and further to provide the support tube with radial venting bores extending from the central bore and opening at the outer surface of the support tube above the flange for relieving from the cathode ray tube envelope, via the exhaust tubulation, the central bore and the radial venting bores, elevated air pressures resulting from the heating of the neck for fusing the latter to the electron gun stem.

The above, and other objects, features and advantages of this invention, will be apparent in the following detailed description of an illustrative embodiment thereof which is to be read in connection with the accompanying drawings, wherein the same reference numerals are employed to identify corresponding parts in the several views of the drawings.

BRIEF DESCRIPTION OF THE DRAWINGS

FIG. 5 is a sectional view taken along the line V—V on FIG. 4;

FIG. 6 is an elevational view of the support tube shown on FIGS. 4 and 5;

FIG. 7 is a longitudinal section view similar to that of FIG. 3, but illustrating the use of the support tube according to this invention in apparatus of the kind illustrated on FIG. 1.

DESCRIPTION OF A PREFERRED EMBODIMENT

Figure 1:
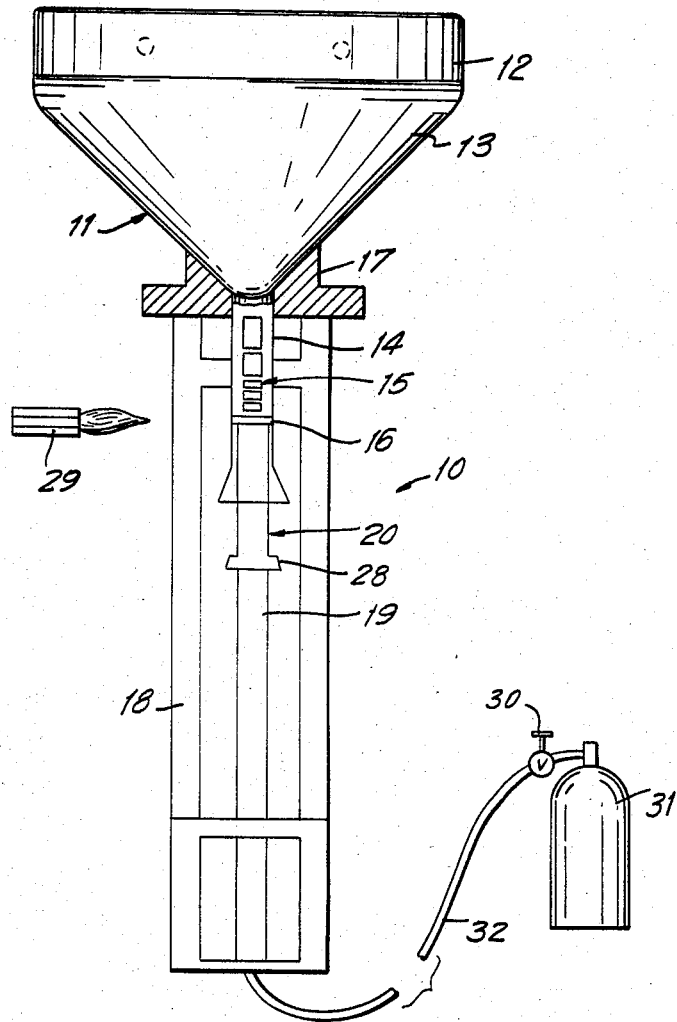
FIG. 1 is a schematic view illustrating an apparatus according to the prior art for mounting an electron gun assembly within the glass neck of a cathode ray tube envelope.

Referring to the drawings in detail, and initially to FIG. 1 thereof, a known apparatus 10 is there shown for use in one stage in the manufacture of a cathode ray tube 11, for example, for a color television receiver. In such manufacture, after a phosphor screen has been formed on the inner surface of a glass face plate 12 and an aperture grill (not shown) is attached to the face plate, the face plate 12 is secured, at its periphery, to the large end of a funnel-shaped envelope 13 having a relatively small diameter glass neck 14. Then, an electron gun assembly 15 is inserted into the glass neck 14 of envelope 13 and secured or mounted therein by fusing or welding together a glass stem 16 of electron gun assembly 15 and the glass neck 14 of the envelope. The apparatus 10 on FIG. 1 is intended for use in effecting such mounting of the electron gun assembly 15 in the neck 14 of envelope 13, and also for use in severing or removing that portion of glass neck 14 which extends beyond glass stem 16 after the welding or fusing to the latter.

The known apparatus 10 is shown to generally comprise a rotatable envelope support or cradle 17 which is adapted to receive envelope 13 with its neck 14 in depending position, and which is mounted on a suitable frame 18. Suitably mounted within the lower portion of frame 18 is a vertically oriented hollow spindle 19 which is axially movable, for example, by a suitable air cylinder (not shown) and which carries a support tube 20 for inserting and positioning the electron gun assembly 15 during its mounting within neck 14.

Figure 3:
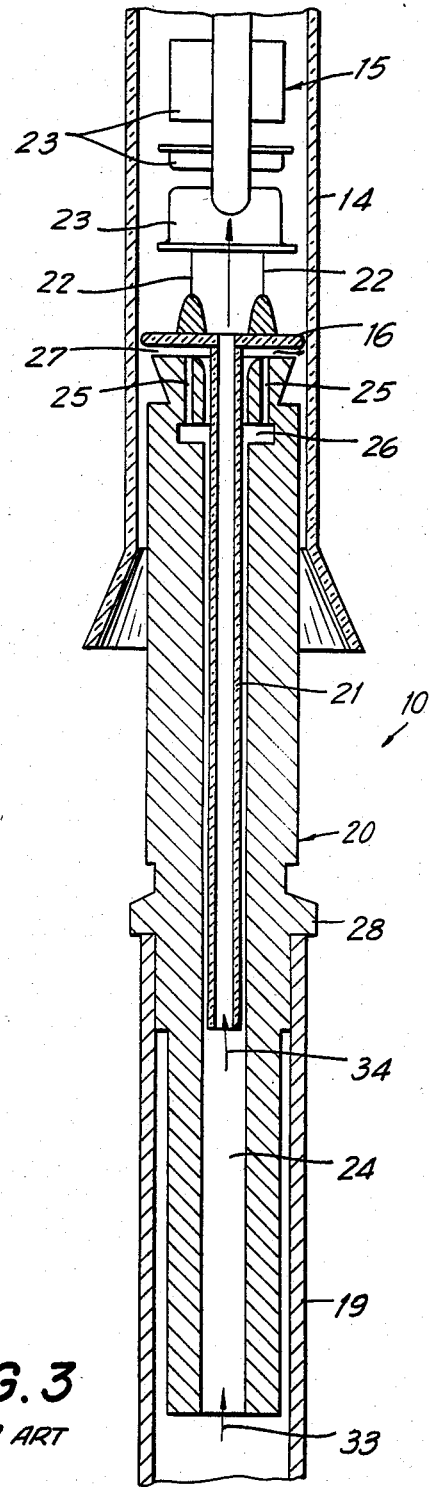
FIG. 3 is a longitudinal sectional view illustrating the use of the support tube of FIG. 2 in the apparatus of FIG. 1 during the mounting of the electron gun assembly within the cathode ray tube envelope, and to which reference will be made in explaining problems encountered in the apparatus according to the prior art.

As shown particularly on FIG. 3, electron gun assembly 15 includes a glass exhaust tubulation 21 extending centrally from the disk-like glass stem 16 for use in evacuating gas from within the envelope after the electron gun assembly has been mounted therein, whereupon the tubulation 21 is sealed or tipped-off for maintaining the evacuated condition of the envelope. Gun assembly 15 is further shown to have a plurality of metallic leads 22 which extend through glass stem 16 in a circle about exhaust tubulation 21 for electrical connections to gun elements 23, such as, grids, focusing electrodes and the like, which will be situated within neck 14.

Figure 2:
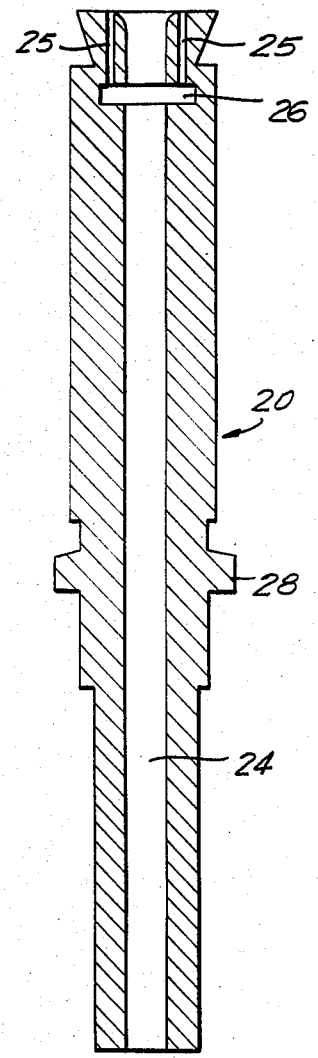
FIG. 2 is an enlarged, longitudinal sectional view of a support tube employed in the prior art apparatus for supporting an electron gun assembly during the mounting of the latter within the envelope.

In the support tube 20 according to the prior art, as shown on FIGS. 2 and 3, a central bore 24 extends axially and opens at both the upper and lower ends of tube 20. The upper end portion of tube 20 has a series of auxiliary bores 25 arranged in a circle about central bore 24 and extending axially from an annular groove 26 opening radially into bore 24. The upper ends of auxiliary bores 25 open at the upper end surface of tube 20 so that the metallic leads 22 of electron gun assembly 15 can be accommodated in auxiliary bores 25 when exhaust tubulation 21 is received in central bore 24. As shown particularly on FIG. 3, the axial length of each of auxiliary bores 25 is usually shorter than the length of the metallic lead 22 to be accommcdated therein so that, when electron gun assembly 15 is supported on tube 20, a radially opening gap 27 exists between the undersurface of stem 16 and the upper end surface of tube 20. The lower end portion of tube 20 below an outwardly directed flange 28 is dimensioned to fit into spindle 19 so that flange 28 may rest on the upper edge of the vertically movable spindle for movement of tube 20 therewith.

In using the apparatus 10 of FIG. 1, envelope 13 is disposed on carriage 17 above spindle 19 while the latter is in a retracted or lowered position. Then, the electron gun assembly 15 is disposed on support tube 20 with exhaust tubulation 21 disposed in central bore 24 and metallic leads 22 accommodated in auxiliary bores 25. The bore 24 is diametrically dimensioned to provide a substantial clearance between its wall surface and tubulation 21 in the central bore. The support tube 20 with the electron gun assembly 15 thereon is then installed in spindle 19 with flange 28 resting on the upper edge of the spindle. Upon upward movement of spindle 19, electron gun assembly 15 is inserted upwardly into neck 14 so as to correctly position the electron gun assembly in respect to the cathode ray tube envelope. With electron gun assembly 15 thus positioned in neck 14, at least one burner 29 is operated to gradually heat the glass neck 14 in the vicinity of the glass stem 16. During such heating, frame 18 may be suitably turned so as to uniformly distribute the heating effect about the glass neck. When the neck 14 and stem 16 are sufficiently heated, the glass of the neck becomes plastic and the weight of the lower end portion of the neck below stem 16 causes drawing of the plastic or molten glass which tends to inwardly constrict the wall of neck 14 into fusing or welding contact with the periphery of glass stem 16.

At the time of such fusing or welding of the wall of neck 14 to the periphery of stem 16, a valve 30 is suitably opened to permit nitrogen gas under pressure to flow from a container 31 thereof through a conduit 32 connected to the lower end of vertically movable spindle 19. Thus, the nitrogen gas under pressure flows upwardly in spindle 19 and through central bore 24 of support tube 20 into the substantial clearance between the surface of bore 24 and tubulation 21. By reason of such clearance, the nitrogen gas admitted to bore 24 at the lower end thereof, as indicated by the arrow 33 on FIG. 3, can flow upwardly around tubulation 21 to exit from the upper end of central bore 24 and pass radially outward through gap 27. The gas flowing upwardly in the clearance between the wall surface of bore 24 and tubulation 21 can also exit through annular groove 26 and auxiliary bore 25 to flow radially outward through gap 27. In both cases, the nitrogen gas under pressure flowing radially outward in gap 27 immediately under stem 16 exerts an outwardly directed pressure against the softened glass of neck 14 immediately below the fusing or welding thereof to stem 16. Such radially outwardly directed pressure causes the glass neck 14 to sever immediately below stem 16, and the severed portion then drops or falls away, for example, onto the flange 28.

However, it will be appreciated that, in the foregoing arrangement according to the prior art for supplying the nitrogen gas under pressure from spindle 19 by way of the central bore 24 of tube 20, such bore 24 also receives the exhaust tubulation 21 of the electron gun assembly so that the nitrogen gas under pressure and any dust particles, usually of glass, carried thereby, is also delivered to tubulation 21, as indicated by the arrow 34 on FIG. 3. Therefore, the nitrogen gas under pressure and any dust carried thereby is deposited through tubulation 21 into envelope 13. As earlier indicated, such dust particles within envelope 13 give rise to serious problems.

Referring now to FIGS. 4–8 in which parts corresponding to those described above with reference to FIGS. 1–3 are identified by the same reference numerals, but with the letter a appended thereto, it will be seen that an apparatus 10a according to this invention for mounting an electron gun assembly 15a within the glass neck 14a of a cathode ray tube envelope differs from the prior art apparatus 10 only in respect to its support tube 20a by which gun assembly 15a is inserted in neck 14a.

Figure 4:
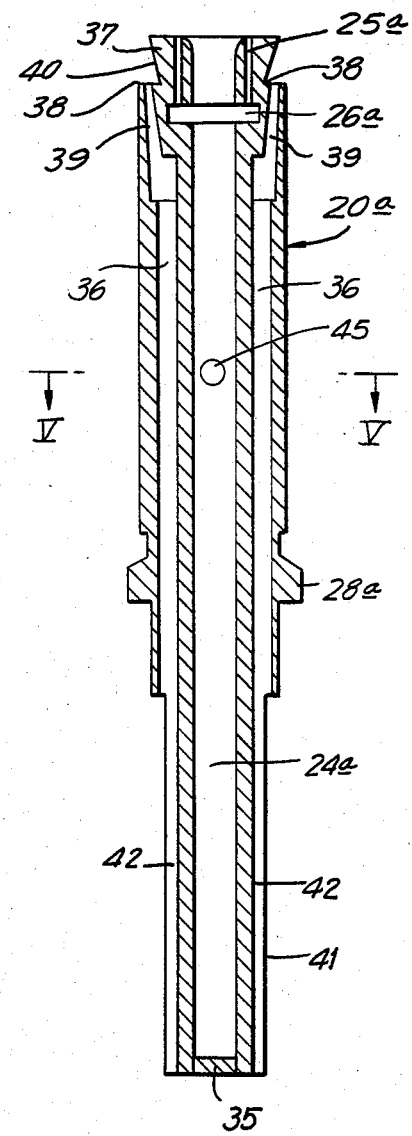
FIG. 4 is a longitudinal sectional view similar to that of FIG. 2, but illustrating a support tube according to an embodiment of the invention.

As shown particularly on FIG. 4, the central bore 24a of support tube 23a opens only at its upper end, and is closed at the lower end of tube 20a, as at 35. Thus, when nitrogen gas under pressure is supplied to the lower end portion of spindle 19a, such gas under pressure, and any dust that may be carried thereby, cannot enter central bore 24a at the lower end thereof, and hence cannot flow through exhaust tubulation 21a into the interior of the cathode ray tube envelope.

In order to supply the nitrogen gas under pressure for severing the glass neck of the envelope upon the fusing or welding thereof to the glass stem 16a of the electron gun assembly, support tube 20a according to the present invention has a plurality of longitudinal passages 36 therein spaced outwardly from central bore 24a (FIGS. 4 and 5) and isolated from bore 24a, that is, having no communication with the latter. Tube 20a desirably has a stepped upper end portion 37 defining an upwardly facing outer shoulder 38 at which upper end portions 39 of passages 36 are arranged to open. The stepped upper end portion 37 of tube 20a is desirably undercut, as at 40, that is, has an upwardly and outwardly inclined surface above shoulder 38 so that gas exiting upwardly from the upper end portions 39 of passages 36 will be directed radially outward by the undercut or inclined surface 40. The lower portion of support tube 20a below flange 28a is desirably of reduced diameter, as at 41 (FIGS. 4 and 6), and longitudinal grooves 42 are formed in the outer surface of the reduce diameter tube portion 41 and communicate or open into the lower ends of passages 36 for transmitting the nitrogen gas under pressure from spindle 19a to passages 36.

Figure 8:
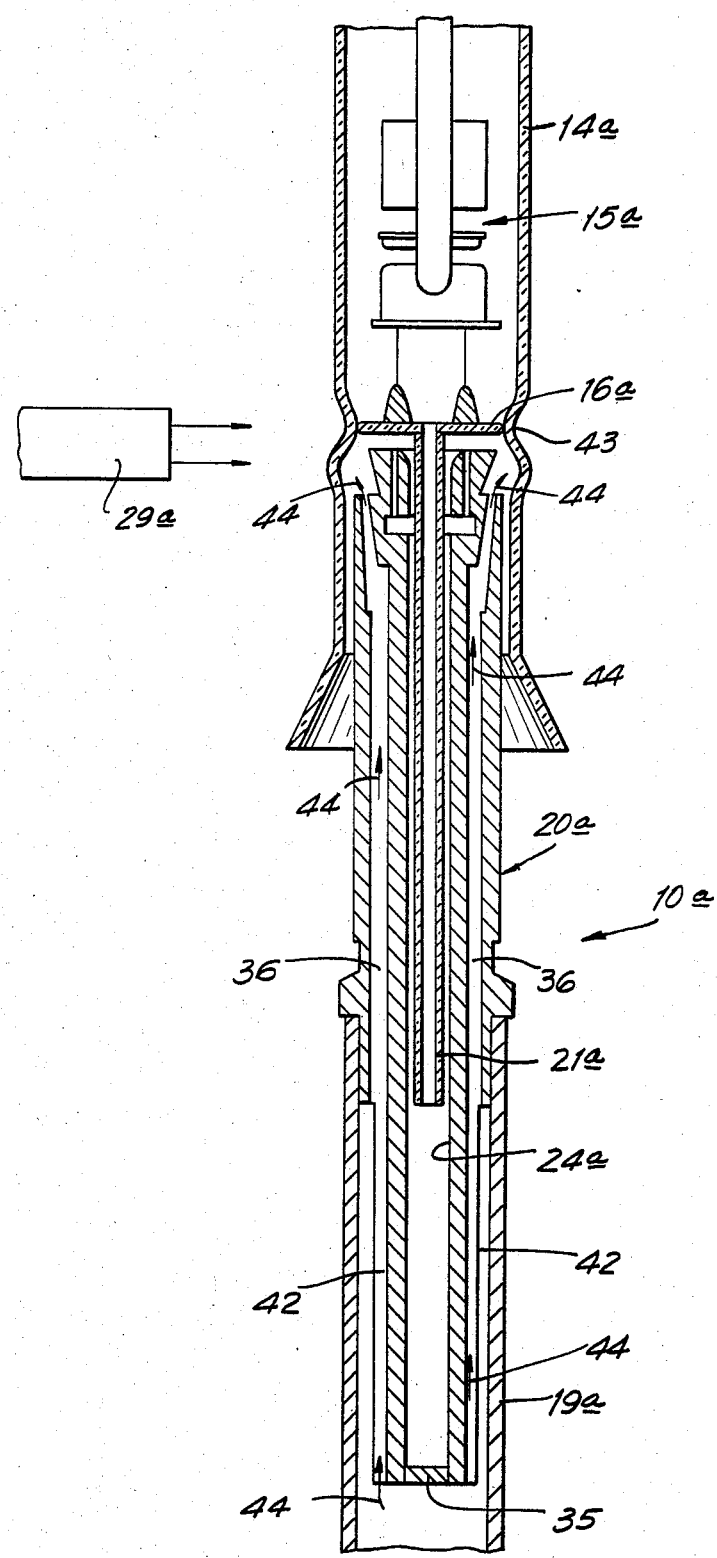
FIG. 8 is a longitudinal section view similar to that of FIG. 7, but illustrating the manner in which the present invention avoids the entry of dust particles into the cathode ray tube envelope during the welding or fusing and severing operations.

Referring now to FIGS. 7 and 8, it will be appreciated that the support tube 20a according to the present invention is used precisely in the same manner as the support tube 20 of the apparatus 10 according to the prior art. Thus, as shown particularly on FIG. 7, the electron gun assembly 15a while supported on tube 20a carried by spindle 19a is inserted upwardly into glass neck 14a of the envelope in response to the upward movement of the spindle with the electron gun assembly 15a which is thus properly positioned. Burner 29a is operated to cause heating of neck 14a in the vicinity of glass stem 16a. As shown on FIG. 8, when the heating of neck 14a in the vicinity of stem 16a softens or melts the glass in the vicinity of the stem, the weight of the portion of the neck below stem 16a causes drawing or constricting of the neck into welding or fusing contact with the periphery of stem 16a, as at 43. At such time, nitrogen gas under pressure is admitted to spindle 19a and flows through grooves 42 and passages 36, as indicated by the arrows 44 on FIG. 8, so as to exit from the upper end portions 39 of the passages and act radially outward against the softened glass of neck 14a for severing the latter immediately below stem 16a to which the neck has been fused.

It will be seen that after fusing of neck 14a to the outer periphery of stem 16a, the interior of the cathode ray tube envelope can communicate with the exterior only through exhaust tubulation 21a. Since the lower end of central bore 24a of support tube 20a is closed, as at 35, radial bores 45 (FIGS. 4–6) are provided in tube 20a extending from the central bore 24a and opening at the outer surface of support tube 20a above flange 28a. Therefore, when the pressure of air in the cathode ray tube envelope is elevated as a result of the heating of the neck 14a, such elevated pressure is vented to the atmosphere via tubulation 21a into central bore 24a, and from the latter through radial venting bores 45.

It will be understood that, when nitrogen gas under pressure is supplied through passages 36, as previously described, for severing neck 14a, such gas under pressure does not enter tubulation 21a, and thus cannot carry glass or other dust into the cathode ray tube envelope to cause the previously described damage.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for mounting an electron gun assembly within the glass neck of a cathode ray tube envelope, which assembly includes a glass stem in the form of a disk with an exhaust tubulation extending centrally therefrom for eventual evacuation of the envelope and metallic leads extending through the stem in a circle about the tubulation for electrical connections to gun elements in the envelope, said apparatus comprising:

an upright support tube having a central bore which is closed at its lower end and opened at the upper end of said support tube for receiving said exhaust tubulation when the electron gun assembly is supported by said tube with said stem above said upper end, and said support tube further having longitudinal passages therein spaced outwardly from said central bore and isolated from the latter, said longitudinal passages each opening at one end adjacent said upper end of the support tube;

means for supporting the cathode ray tube envelope with said glass neck thereof extending downwardly about said stem of the electron gun assembly supported by said tube;

means for heating said glass neck in the vicinity of said stem so as to fuse together said neck and stem; and means for supplying an inert gas under pressure to said longitudinal passages of the support tube so as to exit from said one ends of the passages below said stem and to act on the heated neck for severing the latter immediately below the fusing thereof to said stem.

2. An apparatus according to claim 1; in which said support tube has a stepped upper end portion defining an upwardly facing outer shoulder at which said one ends of the passages open.

3. An apparatus according to claim 2; in which said stepped upper end portion of the tube is undercut for outwardly directing the inert gas exiting from said one ends of the passages.

4. An apparatus according to claim 1; in which said upper end of the support tube has auxiliary bores therein arranged in a circle about said central bore for accommodating said metallic leads of the electron gun assembly when said exhaust tubulation is received in said central bore.

5. An apparatus according to claim 1; in which said support tube has radial venting bores extending from said central bore and opening at an outer surface of said support tube for relieving from the envelope, via the tubulation and said central bore, elevated air pressures resulting from the heating of said neck.

6. An apparatus according to claim 1; in which said means for supplying the inert gas includes a hollow spindle arranged vertically, and a source of said inert gas connected to said spindle; said support tube having a lower portion slidably receivable in said spindle, said lower portion having grooves in its outer surface opening into said passages for transmitting the inert gas from said spindle to said passages.

7. An apparatus according to claim 6; in which said support tube has an outer flange above said lower portion to rest on an upper edge of said spindle, and said support tube further has radial venting bores extending from said central bore and opening in said outer surface of the support tube above said flange for relieving from the envelope, via the tubulation and said central bore, elevated air pressures resulting from the heating of said neck.

8. An apparatus according to claim 7; in which said support tube has a stepped upper end portion defining an upwardly facing outer shoulder at which said one ends of the passages open.

9. An apparatus according to claim 8; in which said stepped upper end portion of the tube is undercut above said shoulder for outwardly directing the inert gas exiting from said one ends of the passages.

10. An apparatus according to claim 8; in which said stepped upper end portion of the support tube has, in the end edge surface thereof, a series of auxiliary bores arranged in a circle about said central bore for accommodating said metallic leads of the electron gun assembly when said exhaust tubulation is received in said central bore.

11. An electron gun mounting tube for use in an apparatus in which an electron gun assembly having a glass stem and exhaust tubulation, and metallic leads extending through the stem is assembled within the glass neck of a cathode ray tube envelope by welding said stem and said glass neck together with an inert gas being supplied into said glass neck through said electron gun mounting tube; said electron gun mounting tube having a central bore which is closed at its lower end and opened at its upper end for receiving said exhaust tubulation when an electron gun is mounted on the tube, said tube further having longitudinal passages for passing said inert gas to said glass neck and being spaced outwardly from said central bore and isolated from the latter, said longitudinal passages each opening at one end adjacent said upper end of the mounting tube.

12. An electron gun mounting tube according to claim 11; further having a stepped upper end portion defining an upwardly facing outer shoulder at which said one ends of the passages open.

13. An electron gun mounting tube according to claim 12; in which said stepped upper end portion is undercut for outwardly directing the inert gas exiting from said one ends of the passages.

14. An electron gun mounting tube according to claim 11; in which said upper end has auxiliary bores therein arranged in a circle about said central bore for accommodating said metallic leads of the electron gun assembly when said exhaust tubulation is received in said central bore.

15. An electron gun mounting tube according to claim 11; further having radial venting bores extending from said central bore and opening at an outer surface for relieving from the envelope, via the tubulation and said central bore, elevated air pressures resulting from the welding said stem and said glass neck.

16. An electron gun mounting tube according to claim 11; further having grooves at the outer surface of a lower portion of the tube, each of said grooves opening into another end of a respective one of said passages.

* * * * *